MULTIPLEX TRANSMISSION SYSTEM
Filed Feb. 25, 1955
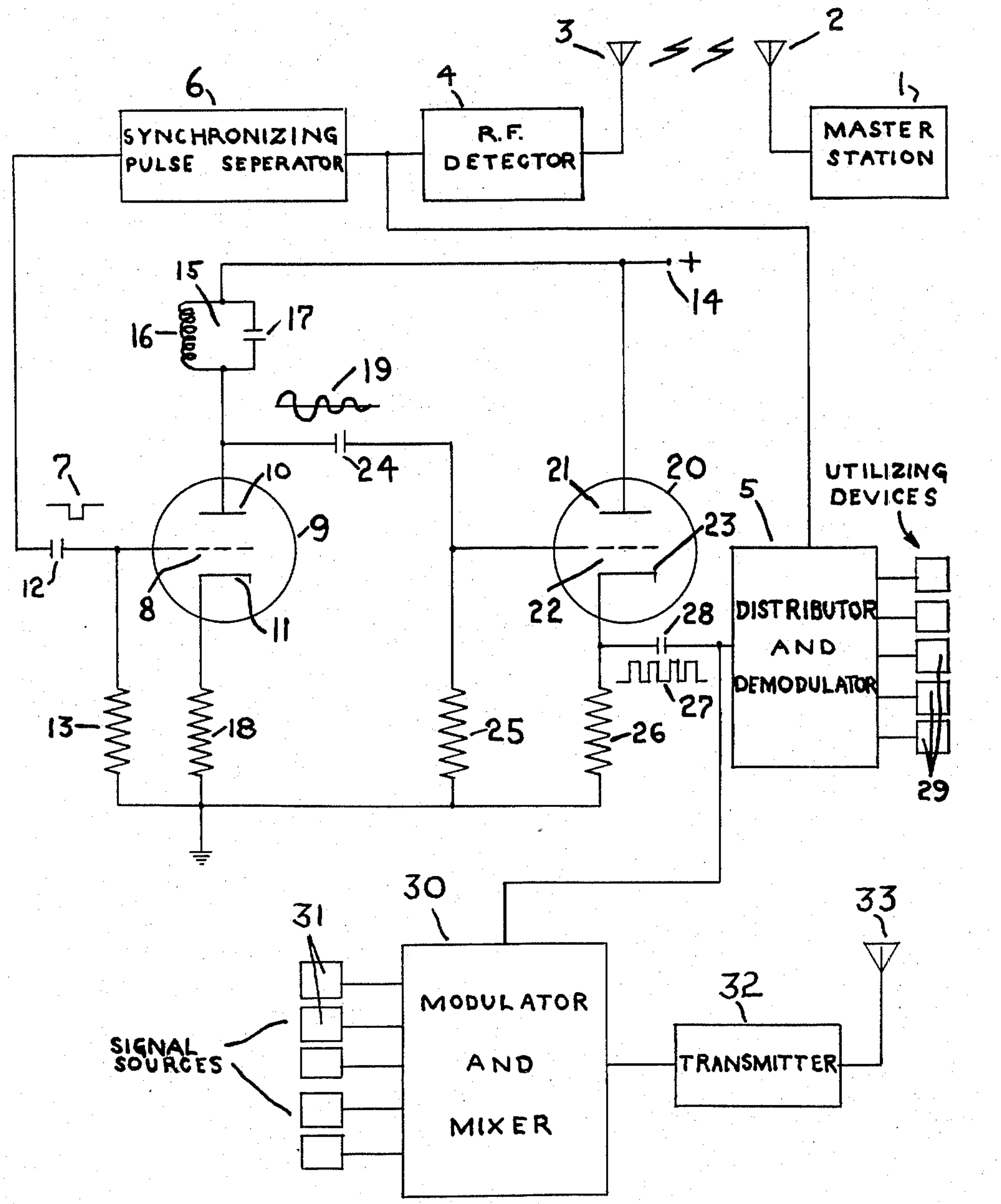
INVENTOR.
R.B. HOFFMAN
T.E. AHLSTEDT
BY Robert Harding Jr.
ATTORNEY 2,918,532

MULTIPLEX TRANSMISSION SYSTEM

Ross Barnum Hoffman, Glen Ridge, and Thure E. Ahlstedt, Roseland, N.J., assignors to International Telephone and Telegraph Corporation, New York, N.Y., a corporation of Maryland Application February 25, 1955, Serial No. 490,616

2 Claims. (Cl. 179—15)

This invention relates to multiplex transmission systems and particularly to a circuit in such a system for producing a timing pulse which may be used to control the distributors, gating circuits, modulators, demodulators, etc.

One of the objects of the invention is to provide a multiplex transmission system which has an improved signal-to-noise ratio over systems heretofore used.

Another object of the invention is to provide a simple circuit in a station of a multiplex system for producing a timing pulse to control the distributors, etc. used in said station.

A feature of the invention is the provision of a tuned circuit at one station of a multiplex transmitting system which is tuned to the repetition frequency of the marker pulse used in the system and which is arranged to be shocked into oscillation by a marker pulse received from another station.

The above mentioned and other features and objects of this invention and the manner of attaining them will become more apparent and the invention itself will be best understood by reference to the following description of an embodiment of the invention taken in conjunction with the accompanying drawings, in which the single figure of the drawings is a schematic diagram of a multiplex transmission system embodying the invention.

In the usual type of multiplex transmission system each station is provided with an oscillator which is adjusted to oscillate at a frequency slightly lower than that of the marker pulse which is produced by the master station. When the station receives the marker pulse, the oscillator is caused to fall into step with the received marker pulse and thereafter to operate in synchronism therewith. A timing pulse is developed from the oscillator and is then used to control the distributors, modulators and demodulators of the station. Since the control of the oscillator depends on the amplitude of the received marker pulse, any noise on the pulse will affect the other elements of the circuit and will be carried through to the reproduced signals or to the signals transmitted by the station. Also, if the receipt of the marker pulse is interrupted by outside interference, noise will be created in the received signals as well as the transmitted signals.

We have found that by means of the invention we can overcome these defects and can improve the signal-to-noise ratio by a factor approaching 3 db.

Referring now to the drawing, a master station 1 is shown having an antenna 2 which is assumed to be transmitting a signal which comprises a marker pulse and a train of modulated signal pulses positioned in time to correspond with a plurality of transmitting channels. The remainder of the drawing represents the essential parts of another station which is assumed to be receiving the signal from the master station. This other station comprises a receiving antenna 3 which feeds into an R.F. detector 4 from which the modulated pulses are delivered to a distributor and demodulator 5 which will be referred to later. Also connected to the detector 4 is a synchronizing pulse separator 6 whose function is to separate out the marker pulse from the other channel pulses in a known manner.

The selected marker pulse, indicated at 7, is delivered from the synchronizing pulse separator 6 to the control electrode 8 of an electron discharge tube 9 which is shown for purposes of illustration as being a three electrode tube having, in addition to the control electrode 8, an anode 10 and a cathode 11. The marker pulse 7 may take either a positive or negative form and is delivered to the control electrode 8 through a coupling capacitor 12. A suitable bias on the control electrode 8 is maintained by means of a grid resistor 13 connected between the control electrode and ground. The anode 10 is connected to a source of positive potential, indicated at 14, through a tuned circuit 15 comprising an inductance 16 and a parallel connected capacitor 17. This is the tuned circuit and the values of the inductance and the capacitor are adjusted so that the circuit is tuned approximately to the repetition frequency of the marker pulse. The cathode 11 is given a suitable bias by connecting it to ground through a resistor 18.

The circuit of the tube 9 is preferably adjusted so that a small anode-cathode current is flowing at all times. When either a negative or a positive pulse arrives on the control electrode 8, the anode-cathode current is increased or decreased suddenly which shocks the tuned circuit 15 into oscillation. Since the tuned circuit 15 is tuned to approximately the frequency of the marker pulse, a succession of marker pulses arriving at the proper time will produce a continuous oscillation in the tuned circuit. If, however, there should be a cessation of the marker pulses for a time representing several of said pulses, the tuned circuit 15 would continue to oscillate with decaying amplitude, such as is illustrated at 19. This fact can be utilized to overcome the effect of skipped marker pulses, as will be later described.

A second tube 20 is provided and is shown for purposes of illustration as a triode having an anode 21, a control electrode 22 and a cathode 23. The anode 10 of the tube 9 is connected by means of a coupling capacitor 24 to the control electrode 22 of the tube 20. This control electrode is suitably biased by means of the resistor 25 which is connected between it and ground. The anode 21 of the tube 20 is directly connected to the source of positive potential 14 and the cathode 23 is connected to ground through a resistor 26.

The circuit of the tube 20 is so adjusted as to permit the oscillation applied to its control electrode 22 from the tube 9 to drive the tube 20 to saturation, and thus a substantially square wave may be formed across the resistor 26 in the cathode circuit. The pulses forming this square wave are represented at 27 and are delivered to the distributor and demodulator 5 through the coupling capacitor 28. They are uniform in amplitude and entirely independent of noise which may have accompanied the marker pulse 7 delivered to the tube 9 and are also independent of omissions of several of the marker pulses. Thus a sequence of pulses are delivered to the distributor and demodulator 5 which occur at the same time as the marker pulses and can be used to control the gating of the distributor and demodulator circuit in the usual manner.

This distributor and demodulator 5 is well known in the art and needs no detailed description. Its function is to produce a sequence of time-positioned pulses under control of the marker pulses, or, in this case, the developed pulses 27, and to open the gates of the several demodulators at the proper times so that the pulse trains delivered directly from the detector 4 to the distributor and demodulator 5 will be demodulated and selectively delivered to the utilizing devices 29 which may represent separate channels leading to separate destinations.

The developed marker pulses 27 are also used to control the distributor or gating circuits for transmitting signals from the station over the plurality of channels in the multiplex system. To this end a modulator and mixer 30 is provided and is supplied with the marker pulses 27 from the coupling capacitor 28. This modulator and mixer is well-known in the art and need not be described further. Its function is to receive a plurality of separate signals from the signal source 31 and by means of well-known gating circuits (a distributor) to produce a train of interleaved time-positioned modulated pulses, modulated respectively by the several signals, and to deliver such train of pulses to the transmitter 32 which will transmit them from the antenna 33. The gating circuits of the modulator and mixer 30 are controlled successively by the pulses 27 in a well-known manner.

In the operation of the system the marker pulses received from the master station operate the tube 9, tuned circuit 15, and the associated tube 20 to develop the sequence of marker pulses which are independent of noise and other interference picked up by the receiving antenna. These developed marker pulses will then control the distributor and demodulator for reproducing the received signal and also the modulator and mixer for transmitting signals originating at the station. It will be seen that any noise picked up by the station receiver will be prevented from reaching the demodulator or the modulator and hence the signal-to-noise ratio will be improved over systems heretofore used.

While we have described above the principles of our invention in connection with specific apparatus it is to be clearly understood that this description is made only by way of example and not as a limitation to the scope of our invention as set forth in the objects thereof and in the accompanying claims.

What is claimed is:

1. In a pulse multiplex system having a plurality of stations in which marker pulses are received from one station and used for controlling the timing of circuits in another station: means at said other station for improving the signal-to-noise ratio comprising means for receiving marker pulses; a circuit tuned approximately to the repetition frequency of said marker pulses; means connected to said tuned circuit and responsive to the receipt of said marker pulses for developing oscillations in said tuned circuit comprising an electron discharge device having an anode, a cathode and a control electrode, and an anode-cathode circuit, the means for receiving the marker pulses being connected to said control electrode and said tuned circuit being connected in said anode-cathode circuit; saturable electronic means connected to said tuned circuit for forming a train of square-topped pulses for each cycle of the oscillation developed in said tuned circuit comprising a second electron discharge device having second anode, cathode and control electrodes, and a second anode-cathode circuit; means for applying said damped oscillations to said second control electrode; means for biasing said second control electrode with respect to said second cathode so as to produce a train of substantially square pulses in said second anode-cathode circuit for each half cycle of said oscillations and means for utilizing the pulses so produced to control said timed circuits in said other station.

2. In a pulse multiplex system having a plurality of stations in which marker pulses are received from one station and used for controlling the timing of the pulses transmitted in the various channels from another station and the timing of the gating circuits of the channel demodulators of said other station: means at said other station for improving the signal-to-noise ratio comprising means for receiving marker pulses from said one station; a circuit tuned approximately to the repetition frequency of said marker pulses; means connected to said tuned circuit and responsive to the receipt of said marker pulses for developing an oscillation in said tuned circuit; means connected to said tuned circuit for producing a discrete train of square-topped pulses for each cycle of the oscillation developed in said tuned circuit comprising an electron discharge device having an anode, a cathode and a control electrode, and an anode-cathode circuit; means for applying said oscillation to said control electrode; means for biasing said control electrode with respect to said cathode so as to produce a substantially square pulse in the anode-cathode circuit for each half cycle of said oscillation and means for utilizing said train of pulses to control the gating of the demodulators for reception and the modulators for transmission.

References Cited in the file of this patent

UNITED STATES PATENTS

| | | |
|---|---|---|
| 2,277,000 | Bingley | Mar. 17, 1942 |
| 2,421,017 | Deloraine et al. | May 27, 1947 |
| 2,431,577 | Moore | Nov. 25, 1947 |
| 2,666,845 | Colton et al. | Jan. 19, 1954 |